(12) United States Patent
Corallo et al.

(10) Patent No.: US 9,309,059 B2
(45) Date of Patent: Apr. 12, 2016

(54) BACON CARD FEEDING SYSTEM (71) Applicant: Packaging Progressions, Inc., Collegeville, PA (US)

(72) Inventors: Charles S. Corallo, Medford Lakes, NJ (US); Renzo Naimo, Gilbertsville, PA (US); Aaron Taney, Douglassville, PA (US); Allen Ely, Downingtown, PA (US)

(73) Assignee: Packaging Progressions, Inc., Collegeville, PA (US)

( * ) Notice: Subject to any disclaimer, the term of this patent is extended or adjusted under 35 U.S.C. 154(b) by 37 days.

(21) Appl. No.: 14/050,455

(22) Filed: Oct. 10, 2013

(65) Prior Publication Data
US 2014/0126986 A1    May 8, 2014

Related U.S. Application Data (60) Provisional application No. 61/721,722, filed on Nov. 2, 2012.

(51) Int. Cl.
| | |
|---|---|
| *B65G 47/53* | (2006.01) |
| *B65H 43/06* | (2006.01) |
| *B65B 25/08* | (2006.01) |
| *B65B 25/00* | (2006.01) |
| *B65G 47/00* | (2006.01) |
| *B65G 47/31* | (2006.01) |
| *B65G 43/08* | (2006.01) |

(Continued)

(52) U.S. Cl.
CPC ............... *B65G 47/00* (2013.01); *B65B 25/08* (2013.01); *B65B 43/185* (2013.01); *B65B 43/44* (2013.01); *B65G 43/08* (2013.01); *B65G 47/31* (2013.01); *B65H 1/14* (2013.01); *B65H 3/0816* (2013.01); *B65H 5/062* (2013.01); *B65B 25/065* (2013.01); *B65H 2511/20* (2013.01); *B65H 2513/51* (2013.01); *B65H 2801/81* (2013.01); *Y10S 414/106* (2013.01)

(58) Field of Classification Search
CPC ...... B65G 43/08; B65G 47/31; B65H 3/0816; B65B 25/08; B65B 43/44; Y10S 414/106
USPC .......... 270/58.31, 58.32; 271/107, 20, 21, 31, 271/90; 414/789.5, 795.4, 796.5, 796.7, 414/796.9, 797, 797.3, 798.2, 798.9, 927, 414/928, 929; 53/156, 157, DIG. 1
See application file for complete search history.

(56) References Cited

U.S. PATENT DOCUMENTS

| | | | | |
|---|---|---|---|---|
| 2,907,152 | A | * 10/1959 | Hensgen | ............... B65B 25/065 426/413 |
| 3,269,082 | A | * 8/1966 | Bonami | ............... B65B 25/065 271/9.01 |

(Continued)

Primary Examiner — Gregory Adams
(74) Attorney, Agent, or Firm — Volpe and Koenig, P.C.

(57) ABSTRACT

A card feeding system that feeds cards from a stack to a conveyor system beneath product being carried. A card feed path arranged between a feed conveyor and the outfeed conveyor includes a fixed feed pinch roll and a pivot arm with a pivoting pinch roll and a pair of delivery rolls. A card stack receiving platform is located beneath a picker arm. An elevator is provided for raising the platform with the card stack. The picker arm has suction cups, and is pivotable from a card pick-up position to a feed position in which the card is positioned between the pivoting and fixed pinch rolls. A controller actuates the elevator, the picker arm, the pivot arm, the fixed and delivery pinch rolls to deliver single ones of the cards as product to be placed on the card transitions from the feed conveyor to the outfeed conveyor.

10 Claims, 7 Drawing Sheets

(51) Int. Cl.
*B65B 43/44* (2006.01)
*B65H 1/14* (2006.01)
*B65H 3/08* (2006.01)
*B65H 5/06* (2006.01)
*B65B 43/18* (2006.01)
*B65B 25/06* (2006.01)

(56) References Cited

U.S. PATENT DOCUMENTS

| | | | | |
|---|---|---|---|---|
| 3,322,301 | A * | 5/1967 | Bliss | 221/1 |
| 3,405,504 | A * | 10/1968 | Marshall | B26D 7/32 53/251 |
| 3,540,187 | A * | 11/1970 | Monaghan | B65B 11/12 426/396 |
| 3,659,838 | A * | 5/1972 | Davis | G06K 13/107 271/107 |
| 3,826,485 | A * | 7/1974 | Shindo | 271/106 |
| 3,870,139 | A * | 3/1975 | Wagner | 198/418.9 |
| 4,328,657 | A * | 5/1982 | Brandmaier et al. | 53/586 |
| 4,532,751 | A * | 8/1985 | Mally et al. | 53/396 |
| 4,690,269 | A * | 9/1987 | Takao | 198/419.2 |
| 4,852,717 | A * | 8/1989 | Ross et al. | 198/462.3 |
| 5,020,786 | A * | 6/1991 | Kimura | B65H 33/04 270/58.32 |
| 5,041,879 | A * | 8/1991 | Akao et al. | 271/107 |
| 5,052,672 | A * | 10/1991 | Horii | 271/9.05 |
| 5,064,183 | A * | 11/1991 | Nishigaki | B65H 3/0883 271/107 |
| 5,336,041 | A * | 8/1994 | Seidel et al. | 414/788 |
| 5,375,967 | A * | 12/1994 | Rathert | 414/789.5 |
| 5,419,677 | A * | 5/1995 | Cohn | B65B 25/08 198/460.3 |
| 5,845,900 | A * | 12/1998 | Greive | 271/98 |
| 6,062,807 | A * | 5/2000 | Johnson et al. | 414/795.8 |
| 6,263,640 | B1 * | 7/2001 | Handel | 53/156 |
| 6,827,545 | B2 * | 12/2004 | Ward | B65G 17/24 414/790.9 |
| 2005/0135918 | A1 * | 6/2005 | Tominaga et al. | 414/795.7 |
| 2009/0038913 | A1 * | 2/2009 | Malenke et al. | 198/617 |

* cited by examiner

BACON CARD FEEDING SYSTEM

INCORPORATION BY REFERENCE

The following documents are incorporated herein by reference as if fully set forth: U.S. Provisional Application No. 61/721,722, filed Nov. 2, 2012.

BACKGROUND

The invention is directed to card feeding system used in connection with a food product conveyor and handling system, and more specifically to a system for placing product carrying cards under a product or group of products being transported by the food product conveyor. Specifically, the card feeding system is for feeding a retail bacon card under a shingled group of bacon slices.

Many types of food products require a substrate in the form of a stiff card placed under the product. For example, retail bacon packages require a card placed under a shingled group of bacon slices. Such systems are also used in connection with food or lunchmeat setups being carried on a food product conveyor. Some of the prior known systems insert flexible sheets of paper utilizing feed rollers that insert the paper through a space between a product feed conveyor and a discharge conveyor as the product passes over the space. However, the known systems are not suitable for inserting cards or rigid substrates. In the known systems, a card is taken from a card stack and then fed by a card conveyor into a gap between the food product feed conveyor and a downstream conveyor. However, these systems are not developed specifically for use in a wash down and high sanitation environment and do not perform well when moist or wet. Further, such systems which feed cards from the bottom of a card stack to the card conveyor typically rely on the weight of the card stack to create an appropriate friction required to feed the cards. This often results in double feeds or missed cards as well as jams when a card only partially feeds due to insufficient loading against the rollers which pull the card from the bottom of the stack and onto the card feed conveyor which then delivers the card beneath the product as it is transported from the product feed conveyor onto a product discharge conveyor through the gap between these conveyors. For systems which utilize suction cups to lift a card from the top of a stack of cards, the suction often results in multiple cards being lifted together, resulting in the same issues with double feeds and jams. These existing systems do not utilize a final staging process ensuring precision substrate to product placement requiring manual rework.

It would be desirable to provide a card feeding system which precisely positions a card beneath a food product, such as a shingled group of bacon slices, at high speed and with high reliability in avoiding double feeds, missed feeds or jams.

SUMMARY

In one aspect, a card feeding system is provided that will allow a user to place a stack of cards into a loading area from where the system moves the stack to a feed area from which singulated cards are fed from the stack to a conveyor system beneath product being carried. The system includes a frame and a housing mounted to the frame. A feed conveyor delivers a product to be placed on a card to a card delivery area. An outfeed conveyor for receiving the card with the product located thereon is located downstream from the feed conveyor. A card feed path with the card delivery area located at a delivery end thereof is arranged between the feed conveyor and the outfeed conveyor. The card feed path includes an intake end with a fixed feed pinch roll and a pivot arm with a pivoting pinch roll. The pivot arm is movable between an open, card receiving position, and a feed position in which the pivoting pinch roll is pressed against the fixed pinch roll. A picker arm is located in proximity to the intake end. A pair of delivery rolls is located in proximity to the delivery end. A card stack receiving platform is located beneath the picker arm that holds a stack of the cards to be fed. An elevator is provided for raising the platform with the card stack. The picker arm includes a support bar that supports at least one suction cup, and is pivotable from a first, card pick-up position to a second, feed position in which a leading edge of the card is positioned between the pivoting pinch roll and the fixed pinch roll when the pivoting pinch roll is in the open, card receiving position. A controller is provided that controls actuation of the elevator, the picker arm, the pivot arm, the fixed feed pinch roll and the delivery pinch rolls to deliver single ones of the cards to the card delivery area as product to be placed on the card transitions from the feed conveyor to the outfeed conveyor.

In one aspect, the feed conveyor includes an infeed conveyor that is generally horizontal and an angled drop conveyor that delivers the product to the card delivery area.

In another aspect, the controller includes a conveyor speed control so that the outfeed conveyor can run a little slower than the feed conveyor to bunch product as it is placed on the card.

In another aspect, a product sensor is located over the feed conveyor to detect a product to be placed on the card and to signal the controller with a position signal for the product.

In another aspect, a card stack sensor is located over the card stack or the card stack receiving platform to detect a position of an uppermost card in the card stack and to signal the controller with a position signal for the card stack to control the elevator.

In another aspect, a picker arm sensor is located on the picker arm to detect a position of an uppermost card on the card stack relative to the picker arm and to detect if one of the cards has been successfully captured by the picker arm, and to signal the controller with a picker arm signal that a card has been picked.

In another aspect, the support bar includes at least two of the suction cups for contacting and holding an uppermost one of the cards in a card stack to the picker arm, and a card singulation bar that is located between the suction cups.

In another aspect, the support bar is pivotable with movement of the picker arm so that the suction cups remain normal to a top surface of the card stack.

In another aspect, a vacuum source is connected to the suction cups, the suction cups are formed as bellows that retract under suction, and the card singulation bar extends beyond a plane defined by the ends of the suction cups in a retracted position so that the card held by the suction cups is adapted to be flexed.

In another aspect, a feed sensor is located along the feed path and detects when one of the cards is in a feed position and signals the controller with a feed sensor signal.

In another aspect, a top stack lift is provided that includes a platform that can be slid under a nearly depleted stack of cards on the card stack receiving platform to allow the elevator to be lowered to receive a new stack of the cards to be fed. The card stack receiving platform is connected to an actuator for movement from a stowed position to a use position. The actuator is controlled by the controller.

According to the invention, a continuous feed of cards at speeds up to 100 cards per minute is possible. This is made possible in part by feeding from the top of the stack of cards and the use of the card isolator that ensures that only a single card is picked up and fed to the card feeding pinch roll at a time. This prevents double feeds which would otherwise be common.

Further, a card loading assembly is provided which allows a new stack of cards to be loaded while the first stack of cards is being fed.

Further details of the invention are explained in detail below and in the claims.

BRIEF DESCRIPTION OF THE DRAWINGS

The foregoing summary as well as the following detailed description will be better understood when read in conjunction with the appended drawings. In the drawings.

DETAILED DESCRIPTION OF THE PREFERRED EMBODIMENTS

Certain terminology is used in the following description for convenience only and is not considered limiting. Words such as "left", "right", "front", "back", "top", and "bottom" designate directions in the drawings to which reference is made. This terminology includes the words specifically noted above, derivatives thereof, and words of similar import. Additionally, the terms "a" and "one" are defined as including one or more of the referenced item unless specifically noted. Additionally, a group of items referred to as "at least one of a, b, or c," refers to any one of a, b, or c, or combinations thereof.

Figure 1:
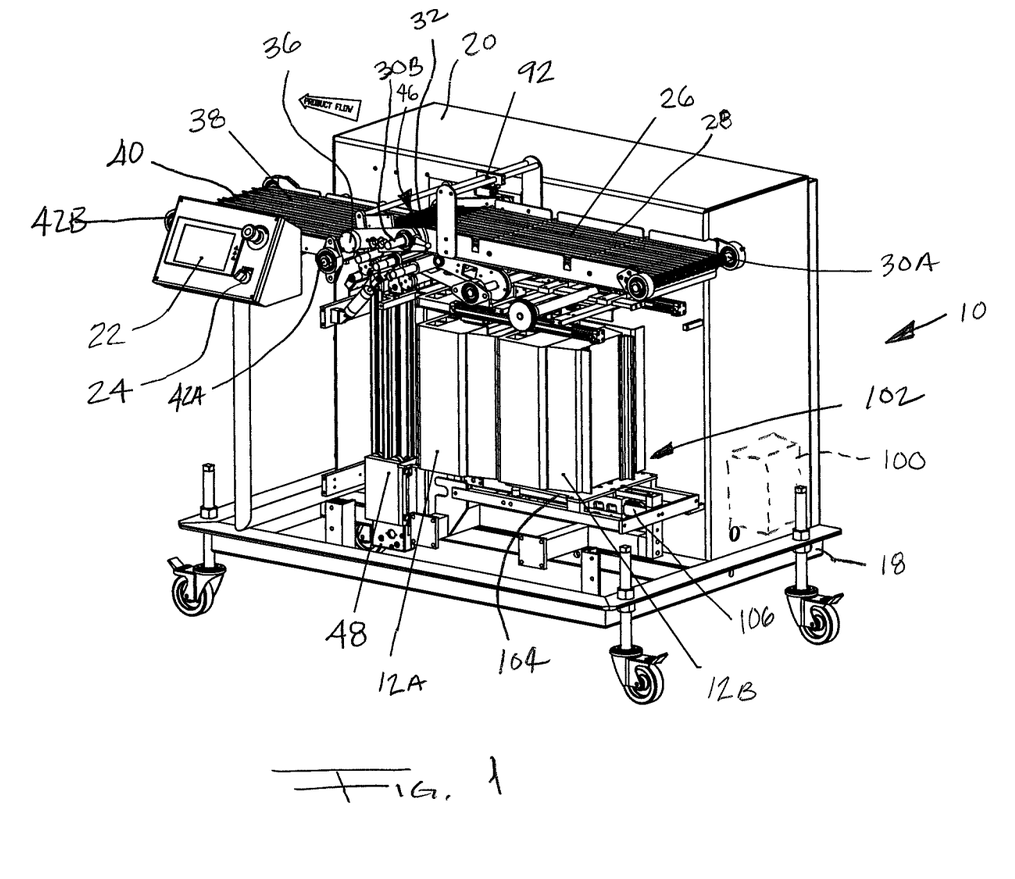
FIG. 1 is a perspective view of a bacon card feeding system in accordance with a preferred embodiment of the invention.
Figure 2:
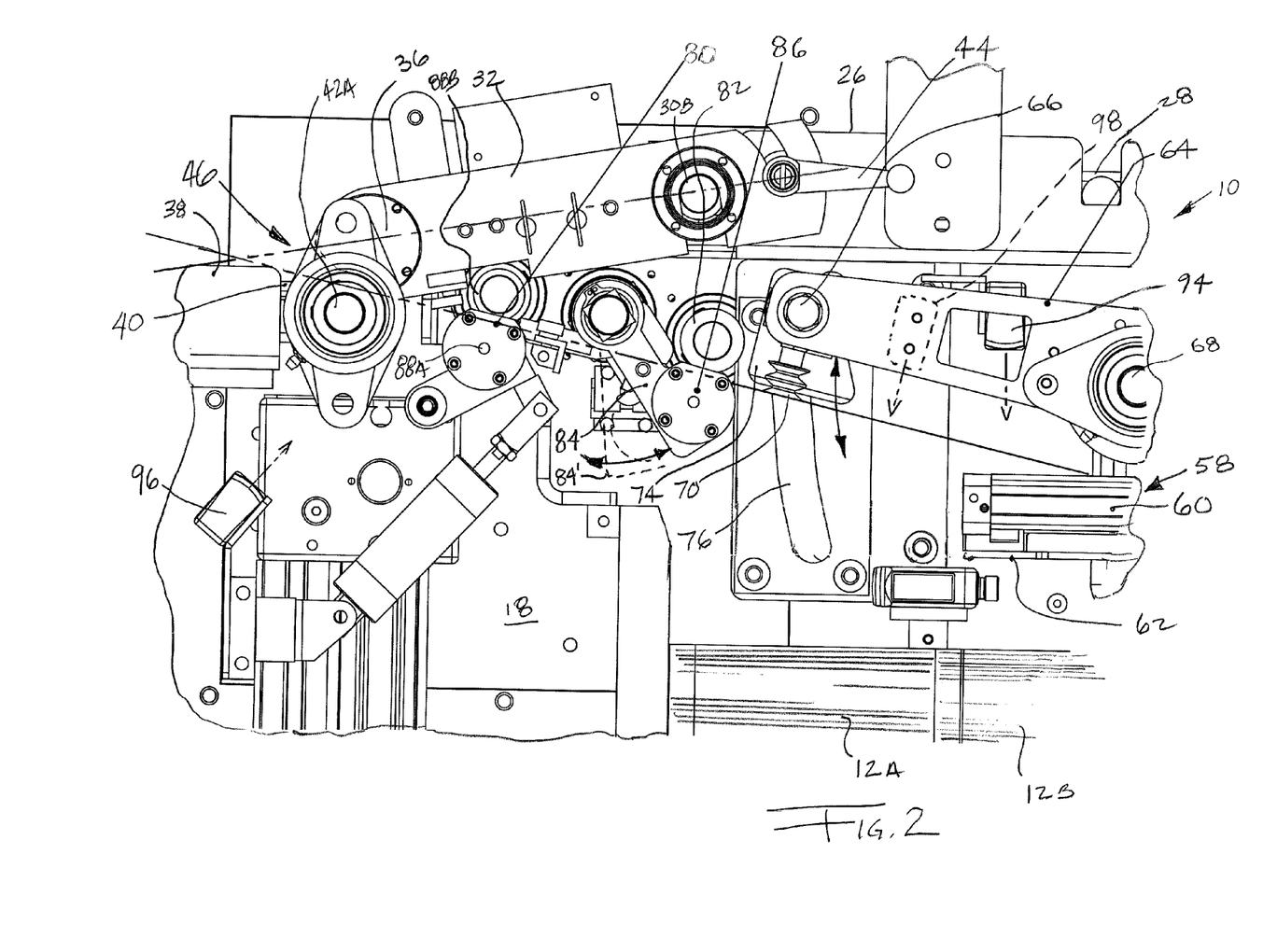
FIG. 2 is a front view showing the picker arm and pivot arm for removing a top card from a card stack and placing it in a feed path where it is fed to a card delivery area located between a feed conveyor and an outfeed conveyor.

Referring now to FIG. 1, the card feeding system 10 in accordance with the present invention is shown in detail. The card feeding system 10 includes a frame 18 which can be a welded stainless steel construction or made of any other suitable material. A housing 20 which encloses the drive motors, discussed below, as well as other drive components and a controller 100, which is preferably a PLC, is mounted to the frame 12. A feed conveyor, preferably formed by a feed conveyor 26 and drop conveyor 32 is shown which delivers a product to be placed on a card 12 to a card delivery area indicated at card feed gap 46. The infeed conveyor 26, shown in further detail in FIG. 5, preferably includes rollers 30a, 30b around which bands 28 are carried. A plurality of bands 28 are used to convey the product, which is preferably a food product and more preferably a grouping of shingled bacon slices to be placed on a card 12 taken from a card stack 12a. The drop conveyor 32, also shown most clearly in FIG. 5, also includes bands 34 which are interdigitated with the bands 28 of the infeed conveyor 26 and rotate about the second roll 30b of the infeed conveyor as well as an additional roll 36 of the drop conveyor. The infeed conveyor 26 is preferably generally horizontal and the drop conveyor 32 is preferably angled downwardly as indicated in FIG. 2. In the preferred embodiment, the drop conveyor 32 is angled downwardly between 5° and 25° and more preferably between 10° and 15°. The card feed gap 46 is located between the downstream end of the drop conveyor 32 and an outfeed conveyor 38. The outfeed conveyor 38 is also preferably a band conveyor including bands 40 which rotate about rollers 42a, 42b shown most clearly in FIG. 5.

In the preferred embodiment, the controller 100 controls a drive motor, which preferably drives the common roll 30b between the infeed conveyor 26 and drop conveyor 32 so that these feed conveyors travel at the same speed. The controller 100 also controls a drive motor, not shown, that drives the first roller 42a of the outfeed conveyor 38. The controller 100 is adapted to control a conveyor speed of the outfeed conveyor 38 so that it can at the same speed or run a little slower than the feed conveyor formed by the infeed conveyor 26 and drop conveyor 32 to bunch product as it is placed on the card 12. The controller 100 also controls the speed of the infeed conveyor 26 and drop conveyor 32.

Figure 5:
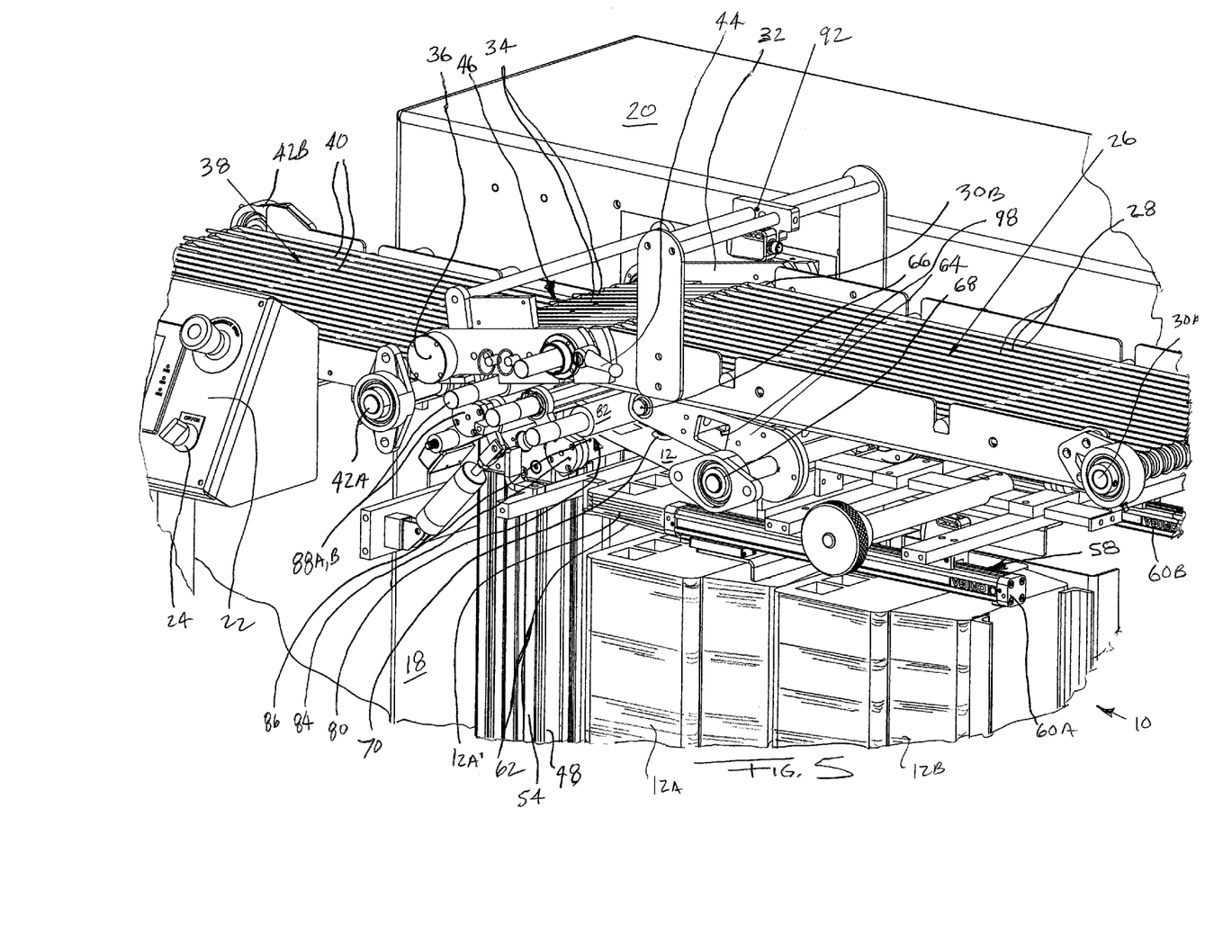
FIG. 5 is a perspective view of the card feed area showing additional details of the bacon card feed system according to the invention.

As shown in FIGS. 1 and 5, a product sensor 92 is located over the infeed conveyor 26. The sensor 92 can be a photoeye 92. However, other types of sensors including break beam sensors can be utilized. The sensor 92 provides a product detection signal to the controller 100 when a product or grouping of products to be placed on a card 12 is detected so that the controller 100 is provided with a position signal for the product in order to initiate the feed of a card 12 beneath the product as it transitions from the drop conveyor 32 to the outfeed conveyor 38.

Preferably, the angle of the drop conveyor 32 is adjustable by tilting the drop conveyor 32 about the axis of the roller 30b and locking it in position using the locking lever 44 which is preferably a threaded clamping arrangement. Thus, the angle of the drop conveyor 32 can be changed depending upon the product being conveyed.

The controller 100 is in communication with the user interface 22 which preferably includes a touch screen. Additional controls such as an on/off switch 24 and an emergency stop button can be provided.

Referring now to FIGS. 1-4, a card feed path 80 for delivery of a card 12 from the card stack 12a to the card delivery area formed by the card feed gap 46 located at the delivery end of card feed path 80 is provided that is arranged between the drop conveyor 32 and the outfeed conveyor 38. The card feed path 80 includes an intake end with a fixed pinch roll 82 and a pivot arm 84 with a pivoting pinch roll 86. The pivot arm 84 is movable between an open, card receiving position indicated in broken lines in FIG. 2 at 84', and a feed position, in which the pivoting pinch roll 86 is pressed against the fixed pinch roll 82 to capture a leading edge of a card 12 being fed. Preferably, the fixed pinch roll 82 is driven by a motor in the motor/controller housing 20 that is controlled by the controller 100. An additional pair of delivery rolls 88A, 88Bb are provided downstream along the feed path 80. These rolls 88A, 88B are also driven by a motor in the motor/control housing 20 that is controlled via the controller 100 in order to accelerate the card 12 along the feed path 80 through the card feed gap 46, in a timed manner with the product, so that the card 12 is inserted beneath the product as it is conveyed from the drop conveyor 32 to the outfeed conveyor 38.

The pinch rolls are preferably coated with a rubber or elastomeric material for gripping the card 12 that is being fed.

Figure 6:
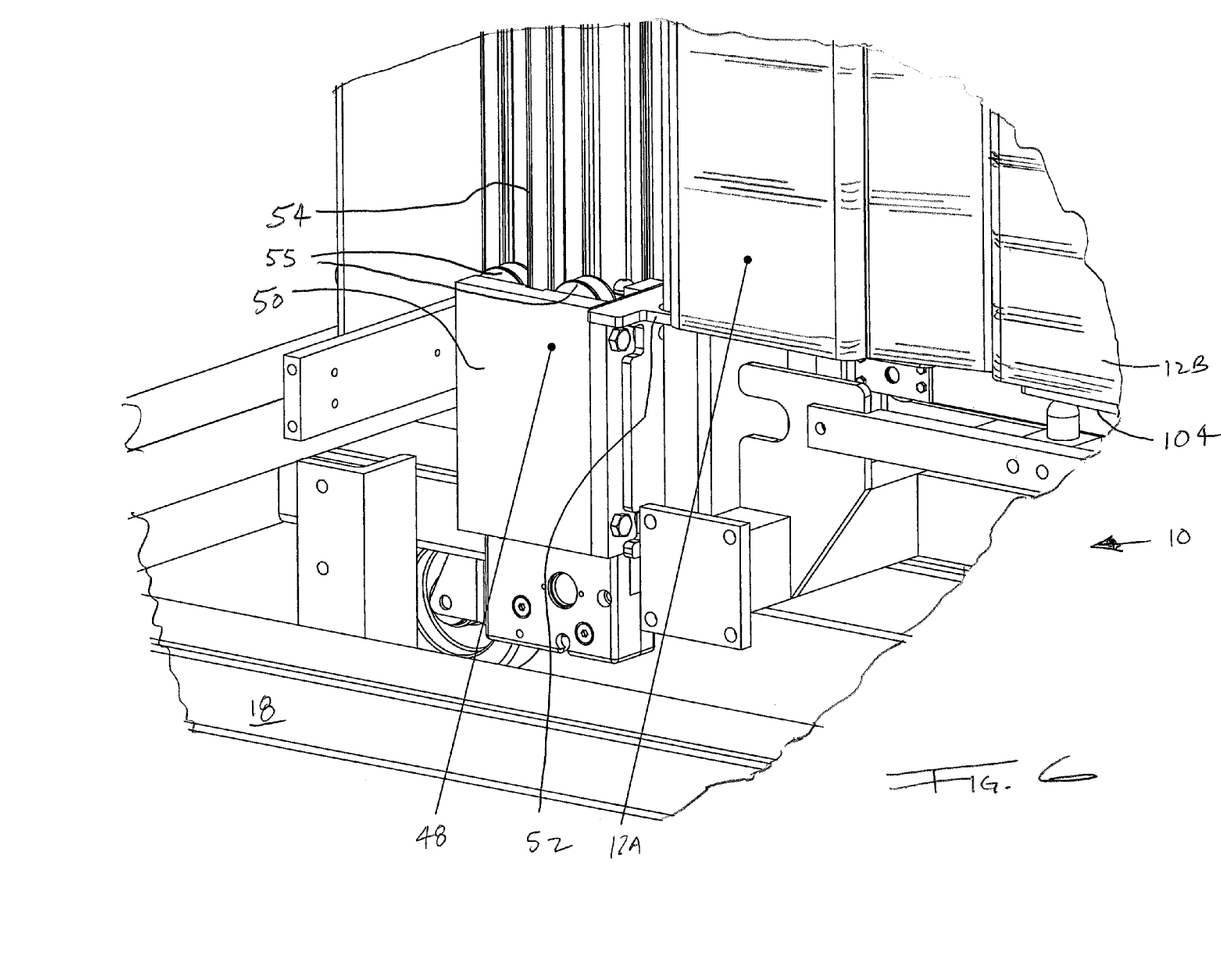
FIG. 6 is a perspective view showing the card stack elevator.

Referring now to FIGS. 1 and 6, a card stack receiving platform in the form of a lift plate 52 is located beneath the card stack 12A from which cards are picked and fed along the card feed path 80. The lift plate 52 is connected to the trolley 50 of an elevator 48 which lifts the card stack 12A as it is depleted when cards are removed from the top thereof. As shown in detail in FIG. 6, rollers 55 are provided on the trolley 50 and are guided along support columns 54 mounted to the frame 18. The lift plate 52 is preferably formed from a plurality of fingers which extend under the card stack 12A. These fingers are spaced apart such that the card loading plate 104 for a second stack of cards 12B shown in FIG. 1 can slide into the spaces between the fingers on the lift plate 52 to deliver the second stack of cards 12B to the elevator once the first stack of cards 12A has been depleted and the elevator is returned to its lowermost loading position. The card loading plate 104 in the card loading area 102 is moved into and out of the loading position where it places the card stack 12B on the lift plate 52 via an actuator 106 indicated in FIG. 1 which is also controlled via the controller 100.

Figure 3:
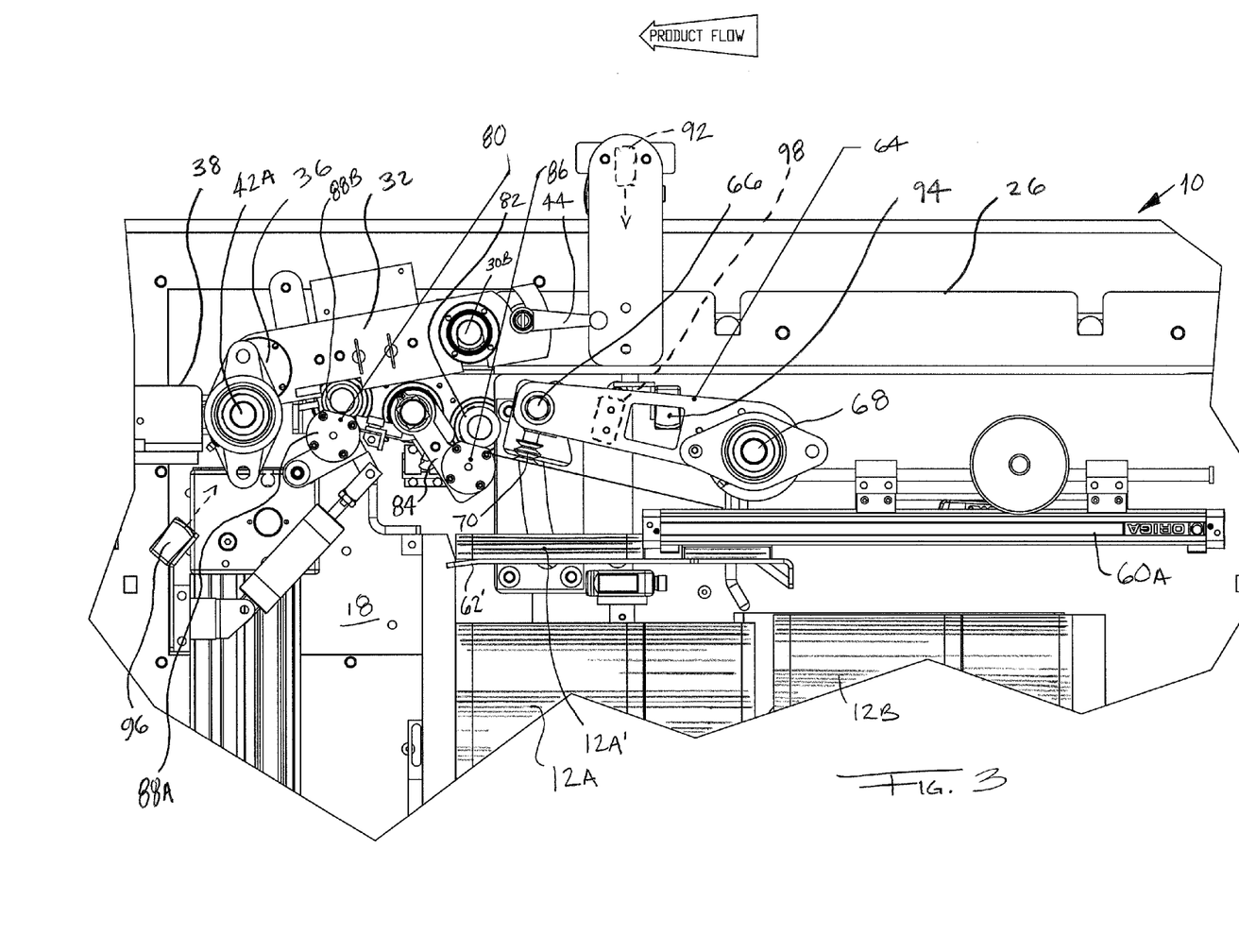
FIG. 3 is an enlarged view similar to FIG. 2 showing a top stack lift assembly holding the bottom most cards in a card stack that is nearly depleted above a card loading area in order to allow a new card stack to be placed on to the card stack elevator.

As shown in FIGS. 2 and 3, preferably a card stack sensor 94 is located over the card stack 12a or the card stack receiving platform in the form of the lift plate 52 to detect a position of an upper most card 12 in the card stack 12A and to signal the controller 100 with a position signal for the card stack 12A. This is used by the controller 100 to raise the elevator as cards 12 are picked from the top of the card stack 12A.

Figure 7:
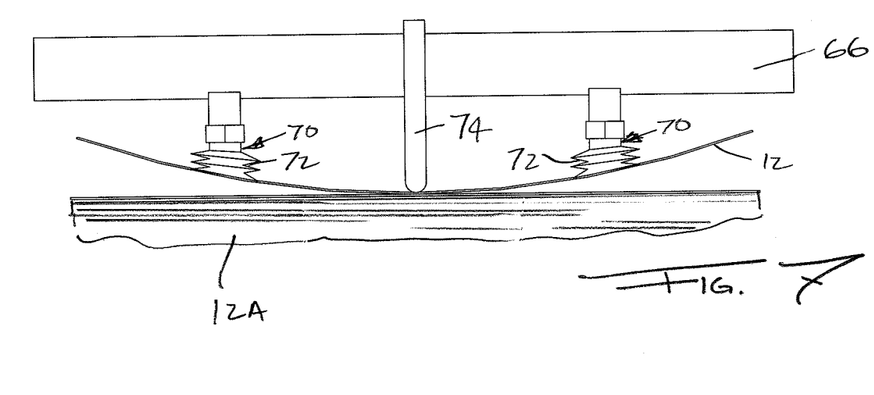
FIG. 7 is an enlarged view showing the support bar and suction cups on the picker arm as a top most card in a card stack is picked.

In order to pick the top card 12 off of the card stack 12A, a picker arm 64 is mounted for pivoting movement above the card stack 12A. This is shown in detail in FIGS. 2-5. The picker arm 64 is preferably driven via a servo motor located in the motor/control housing 20 and controlled via the controller 100. A support bar 66 is mounted at one end of the picker arm 64 and pivot mounts 68 are provided at the other end of the pivot arm in order to support the pivoting motion. The support bar 66, shown in detail in FIG. 7, supports two suction cups 70 and a card singulation bar 74 located therebetween. The suction cups 70 are for contacting and holding an upper most one of the cards 12 in the first card stack 12A. The support bar 66 is preferably pivotally mounted for pivotable movement on the picker arm 64 so that the suction cups 70 remain normal to a top surface of the card stack 12A. Compare FIG. 3 and FIG. 4. The card singulation bar 74 is located below a plane defined by the ends of the suction cups 70 in the retracted position so that the card 12 held by the suction cups 70 is flexed in order to dislodge any additional card which may be stuck on its underside. Preferably, the suction cups 70 are in the form of bellows 72 so that they retract under suction. In the preferred embodiment, the bellows 72 retract by approximately ⅝ of an inch. This provides an additional benefit of not requiring the picker arm 64 to be precisely positioned height wise above the card stack 12A due to the adjustable nature of the bellows 72 used in connection with the suction cups 70.

Figure 4:
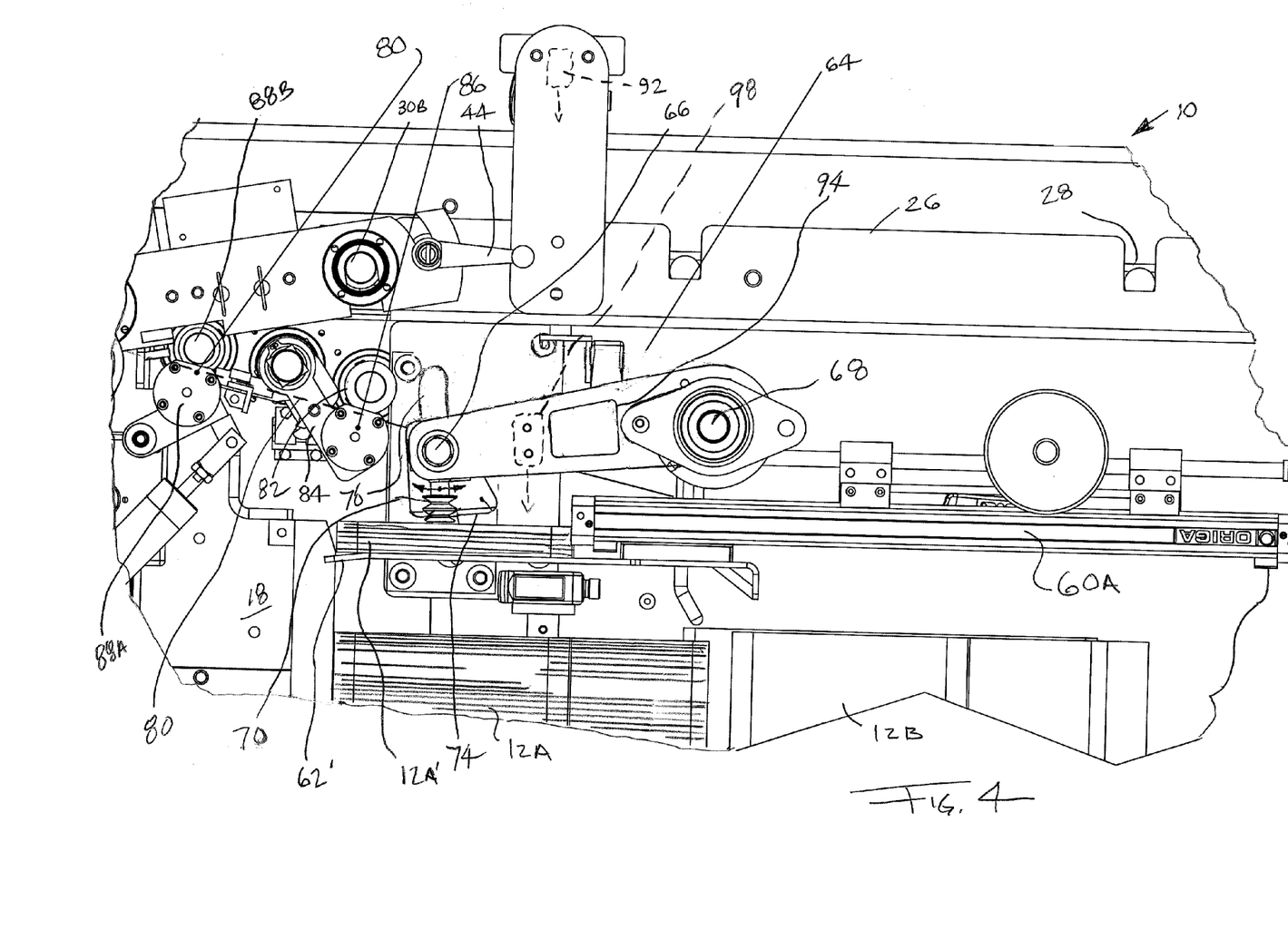
FIG. 4 is an enlarged view similar to FIG. 3 showing the picker arm in a picking position.

The picker arm 64 is moveable between a first, card pick-up position, shown in FIG. 4, and a second, feed position, shown in FIGS. 2 and 3, in which a leading edge of the card 12 is positioned between the pivoting pinch roll 86 and the fixed feed pinch roll 82 when the pivoting pinch roll 86 is in the open, card receiving position (shown in dashed lines in FIG. 2).

As shown in FIGS. 2-4, a picker arm sensor 98 is located on the picker arm 64 to detect a position of an upper most card 12 on the card stack 12a relative to the picker arm 64 and to detect if one of the cards 12 has been successfully captured by the picker arm 64. The picker arm sensor 98 provides a picker arm signal to the controller 100 that a card 12 has been successfully picked.

As shown in FIGS. 2 and 3, a feed sensor 96 is also provided which looks at the bottom of the feed path 80 for a card 12 that has been picked and moved to a position to be fed by the delivery pinch rolls 88A, 88B. This feed sensor 96 is preferably a photoeye and detects a leading edge of the card 12 to be fed and provides a feed sensor signal to the controller 100.

The controller 100 controls actuation of the elevator 48, the picker arm 64, the pivot arm 84 as well as actuation of the fixed feed pinch roll 82 and the delivery pinch rolls 88a, 88b to deliver a single one of the cards 12 to the card delivery area provided by the card feed gap 46 as product to be placed on the card 12 transitions from the feed conveyor 26, 32 to the outfeed conveyor 38. The controller 100 times this feed operation based on the product sensor 92 detecting the product as well as the controller 100 controlling the speed of the infeed conveyor 26 and drop conveyor 32 as well as the outfeed conveyor 38.

As shown in FIG. 2, preferably the feed path 80 is angled up from horizontal by about 5° to 25° or more preferably between 10° and 15°, depending upon the product being placed on a card 12 in order to decrease the amount of movement or dislodging of the product as it transitions onto the card 12. The inventors have found that by angling the drop conveyor downwardly, preferably between 10° and 15° to horizontal and angling the feed path 80 upwardly, preferably by 10° to 15°, particularly for stacking shingled groupings of bacon slices onto a retail card, this is particularly effective to prevent the bacon from becoming dislodged and moving out of position.

The controller 100 also uses the elevator photoeye 94 to detect a position of a top most card 12 on the card stack 12A and indexes the elevator 48 up so that the top most card 12 falls within the range of the picker arm 64. This positioning is not required to be exact due to the use of the bellows 72 in connection with the suction cups 70. The controller 100 also controls the supply of a vacuum to the suction cups 70 when the picker arm 64 is in the first, card pick-up position, shown in FIG. 4, and to release the card 12 once the picker arm 64 is in the second, feed position once the pivoting pinch roll 86 on the pivot arm 84 is in the feed position in which the pivoting pinch roll 86 is pressed against the fixed pinch roll 82.

The controller 100 does not necessarily control the movement of the suction cups 70 so that they are maintained normal to a surface of the top most card 12 in the stack 12A as this can be accomplished with a cam mechanism or any other suitable mechanism on the picker arm 64 based on its pivoting reciprocating movement.

Referring to FIGS. 2 and 3, a top stack lift 58 which allows a nearly depleted stack 12A of cards 12 to be replaced with a second stack of cards 12B is shown. In FIG. 2, the platform 62 of the top stack lift 58 is shown in the retracted position out of the way of the feed path of the stack 12A. When the stack 12A is nearly depleted, the controller 100 actuates the air cylinders 60A, 60B, shown in detail in FIG. 5, in order to insert the platform (indicated as 62' when inserted) under the stack 12a. The platform 62 includes fingers which are inserted between the spaces defined between the fingers of the elevator lift plate 52. Once the top stack lift platform 62' is in position, as shown in FIG. 3, the elevator 48 can be lowered and the next stack 12B loaded onto the elevator lift plate 52 using the loading plate 104 and actuator 106 described above and shown in FIG. 1. After the last card on the top stack lift platform 62' has been picked by the picker arm 64, the actuators 60A, 60B withdraw the platform 62 back to the stowed position so that the elevator 48 can raise the new stack 12a of cards into position and continue feeding uninterrupted.

Using the card feed system 10, and particularly for use in connection with feeding cards underneath groupings of shingled bacon slices, feed speeds of 100 cards per minute can be achieved. Once the stack 12A is loaded on to the elevator lift plate 52, the controller 100 indexes the elevator 48 upwardly so that the top most card 12 is within range of the picker arm 64. The actuator 100 actuates the picker arm 64 to move between the first, card pick up position, shown in FIG. 4, and the second, feed position, shown in FIGS. 2 and 3 in which the leading edge of the card 12 is positioned between the pivoting pinch roll 86 on the pivot arm 84 and the fixed pinch roll 82. This is done with the pivot arm 84 in an open, card receiving position. Once the picker arm 64 is in the second position, the pivot arm 84 is moved to the feed position such that the pivoting pinch roll 86 engages the card 12. The controller 100 then releases the vacuum from the suction cups 70 so that the card 12 is moved forward via the pinch rolls 82, 86 as well as possibly the feed pinch rolls 88a, 88b so that the card 88 is in position where it is detected by the feed photoeye 96. This is then signaled to the controller 100. When a product passes beneath the product photoeye 92, the controller 100, using the speed of the feed conveyor (in feed conveyor 26, drop conveyor 32) actuates the feed pinch rolls 88a, 88b to accelerate the card 12 in time with the product being delivered to the card delivery area formed by the card feed gap 46. The controller 100 controls the speed of the outfeed conveyor 38 so that it is the same as or slightly slower than the speed of the feed conveyor in order to allow the product being delivered onto the card 12 to be bunched together, if necessary, depending on the product properties. This has proven beneficial in connection with stacking bacon. During the time that the card 12 is being fed through the card feed gap 46, the controller 100 is controlling the elevator 48, the picker arm 64 and the pivot arm 84 to load the next card 12 from the card stack 12A. In order to move the elevator 48 up, the controller 100 utilizes the elevator sensor 94. Additionally, in order to ensure that a card 12 has been picked, the picker arm sensor 98 signals the controller 100 that a card has been successfully engaged by the suction cups 70.

Because of the configuration of the suction cups 70, the card feed system 10 can be used with differently shaped cards. Further, if the length of the cards changes, this can be programmed into the controller 100 via the user interface 22 in order to adjust the feed timing for the cards 12 as they are discharged through the feed gap 46.

While the preferred embodiment provides for inserting cards under groups of shingled bacon slices, the invention can be used for various other types of card insertion. Accordingly, those skilled in the art will recognize that various changes in modifications can be made to the present system without departing from the concepts described above in connection with the preferred embodiment, which are considered to be merely exemplary.

What is claimed is:

1. A card feeding system comprising:
   a frame and a housing mounted to the frame;
   a feed conveyor that delivers a product to be placed on a card to a card delivery area;
   an outfeed conveyor adapted to receive the card with the product located thereon;
   a card feed path having the card delivery area located at a delivery end thereof arranged between the feed conveyor and the outfeed conveyor, the card feed path further including an intake end with a fixed feed pinch roll and a pivot arm with a pivoting pinch roll, the pivot arm is movable between an open, card receiving position, and a feed position in which the pivoting pinch roll is pressed against the fixed feed pinch roll, and a pair of delivery rolls located in proximity to the delivery end;
   a card stack receiving platform located beneath the picker arm that holds a stack of the cards to be fed, and an elevator for raising card stack;
   a picker arm with a support bar that supports at least one suction cup, the picker arm is pivotable from a first, card pick-up position to a second, feed position in which a leading edge of the card is positioned between the pivoting pinch roll and the fixed pinch roll when the pivoting pinch roll is in the open, card receiving position;
   a controller that controls actuation of the elevator, the picker arm, the pivot arm, the fixed feed pinch roll and the delivery pinch rolls to deliver single ones of the cards to the card delivery area as product to be placed on the card transitions from the feed conveyor to the outfeed conveyor;
   the controller includes a conveyor speed control that runs the outfeed conveyor at a slower speed than the feed conveyor as product is delivered to bunch the product as it is placed on the card; and
   the feed conveyor includes an infeed conveyor that is generally horizontal and an angled drop conveyor that is angled down from horizontal by about 5 to 25 degrees and delivers the product to the card delivery area, and the card feed path is angled up from horizontal by about 5 to 25 degrees.

2. The card feeding system according to claim 1, wherein a product sensor is located over the feed conveyor to detect a product to be placed on the card and to signal the controller with a position signal for the product.

3. The card feeding system according to claim 1, wherein a card stack sensor is located over the card stack or the card stack receiving platform to detect a position of an uppermost card in the card stack and to signal the controller with a position signal for the card stack.

4. The card feeding system according to claim 1, wherein a picker arm sensor is located on the picker arm to detect a position of an uppermost card on the card stack relative to the picker arm and to detect if one of the cards has been successfully captured by the picker arm, and to signal the controller with a picker arm signal that a card has been picked.

5. The card feeding system according to claim 1, wherein the support bar includes at least two of the suction cups for contacting and holding an uppermost one of the cards in a card stack to the picker arm, and a card singulation bar that is located between the suction cups.

6. The card feeding system according to claim 5, wherein the support bar is pivotable with movement of the picker arm so that the suction cups remain normal to a top surface of the card stack.

7. The card feeding system according to claim 5, wherein a vacuum source is connected to the suction cups, the suction cups are formed as bellows that retract under suction, and the card singulation bar extends beyond a plane defined by ends of the suction cups in a retracted position so that the card held by the suction cups is adapted to be flexed.

8. The card feeding system according to claim 1, wherein a feed sensor is located along the feed path and detects when one of the cards is in a feed position and signals the controller with a feed sensor signal.

9. The card feeding system according to claim 1, further comprising a top stack lift including a platform that can be slid under a nearly depleted stack of cards on the card stack receiving platform to allow the elevator to be lowered to receive a new stack of the cards to be fed.

10. The card feeding system according to claim 9, wherein the card stack receiving platform is connected to an actuator for movement from a stowed position to a use position, the actuator is controlled by the controller.

* * * * *